US012601293B2

(12) United States Patent
Qiu et al.

(10) Patent No.: US 12,601,293 B2
(45) Date of Patent: *Apr. 14, 2026

(54) GAS TURBINE ENGINE INLET

(71) Applicant: RTX Corporation, Farmington, CT (US)

(72) Inventors: Yuan J. Qiu, Glastonbury, CT (US); Robert M. Miller, Bloomfield, CT (US); Wesley K. Lord, South Glastonbury, CT (US); Gavin Hendricks, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/958,405

(22) Filed: Oct. 2, 2022

(65) Prior Publication Data
US 2023/0025200 A1       Jan. 26, 2023

Related U.S. Application Data

(63) Continuation of application No. 14/767,396, filed as application No. PCT/US2014/018544 on Feb. 26, 2014, now Pat. No. 11,480,104.
(Continued)

(51) Int. Cl.
*F02C 7/04*       (2006.01)
*B64D 33/02*       (2006.01)
(Continued)

(52) U.S. Cl.
CPC ................. *F02C 7/04* (2013.01); *F01D 5/02* (2013.01); *F01D 17/105* (2013.01); *F01D 25/24* (2013.01);
(Continued)

(58) Field of Classification Search
None
See application file for complete search history.

(56) References Cited

U.S. PATENT DOCUMENTS 2,258,792 A    10/1941   New
2,936,655 A     5/1960   Peterson et al.
(Continued)

FOREIGN PATENT DOCUMENTS

EP          0791383 A1     8/1997
EP          1142850 A1    10/2001
(Continued)

OTHER PUBLICATIONS

Gliebe, P.R. and Janardan, B.A. (2003). Ultra-high bypass engine aeroacoustic study. NASA/CR-2003-21252. GE Aircraft Engines, Cincinnati, Ohio. Oct. 2003. (Year: 2003).*
(Continued)

*Primary Examiner* — Phutthiwat Wongwian
*Assistant Examiner* — Roberto Toshiharu Igue
(74) *Attorney, Agent, or Firm* — Carlson, Gaskey & Olds, P.C.

(57)       ABSTRACT

A gas turbine engine includes a fan section including a fan. A fan nacelle surrounds the fan and includes an inlet with an inlet leading edge plane and a throat. A compressor section is arranged in a core nacelle and includes a first compressor and a second compressor. A turbine section is arranged in the core nacelle and includes a fan drive turbine and a second turbine. A fan hub mounts the fan and a spinner axially forward of the fan. The fan drive turbine drives the fan through a geared architecture. The fan includes a fan leading edge forward-most point spaced apart from the inlet leading edge plane by an inlet length. The spinner includes a spinner length from a spinner forward-most point to the fan leading
(Continued)

edge forward-most point. A ratio of the spinner length to inlet length is greater than or equal to 0.5.

25 Claims, 3 Drawing Sheets

Related U.S. Application Data

(60) Provisional application No. 61/772,460, filed on Mar. 4, 2013.

(51) Int. Cl.

| | |
|---|---|
| *F01D 5/02* | (2006.01) |
| *F01D 17/10* | (2006.01) |
| *F01D 25/24* | (2006.01) |
| *F02C 3/04* | (2006.01) |
| *F02K 3/06* | (2006.01) |

(52) U.S. Cl.
CPC ................. *F02C 3/04* (2013.01); *F02K 3/06* (2013.01); *B64D 2033/0286* (2013.01); *F05D 2220/32* (2013.01); *F05D 2220/36* (2013.01); *F05D 2240/303* (2013.01); *F05D 2250/323* (2013.01); *F05D 2250/511* (2013.01); *F05D 2260/40* (2013.01); *Y02T 50/60* (2013.01)

(56) References Cited

U.S. PATENT DOCUMENTS

| | | | |
|---|---|---|---|
| 3,021,731 A | | 2/1962 | Stoeckicht |
| 3,194,487 A | | 7/1965 | Tyler et al. |
| 3,222,863 A | * | 12/1965 | Klees ...................... F02C 7/042 |
| | | | 244/15 |
| 3,287,906 A | | 11/1966 | Mccormick |
| 3,352,178 A | | 11/1967 | Lindgren et al. |
| 3,412,560 A | | 11/1968 | Gaubatz |
| 3,546,882 A | | 12/1970 | Berkey |
| 3,623,494 A | | 11/1971 | Poucher |
| 3,664,612 A | | 5/1972 | Skidmore et al. |
| 3,747,343 A | | 7/1973 | Rosen |
| 3,754,484 A | | 8/1973 | Roberts |
| 3,763,874 A | | 10/1973 | Wilde |
| 3,765,623 A | | 10/1973 | Donelson et al. |
| 3,820,719 A | | 6/1974 | Clark et al. |
| 3,843,277 A | | 10/1974 | Ehrich |
| 3,892,358 A | | 7/1975 | Gisslen |
| 3,932,058 A | | 1/1976 | Harner et al. |
| 3,935,558 A | | 1/1976 | Miller et al. |
| 3,946,830 A | | 3/1976 | Kutney et al. |
| 3,988,889 A | | 11/1976 | Chamay et al. |
| 4,129,984 A | | 12/1978 | Nelson |
| 4,130,872 A | | 12/1978 | Haloff |
| 4,142,365 A | | 3/1979 | Sargisson |
| 4,220,171 A | | 9/1980 | Ruehr et al. |
| 4,240,250 A | * | 12/1980 | Harris ...................... F02C 7/045 |
| | | | 60/39.093 |
| 4,284,174 A | | 8/1981 | Salvana et al. |
| 4,289,360 A | | 9/1981 | Zirin |
| 4,478,551 A | | 10/1984 | Honeycutt, Jr. et al. |
| 4,649,114 A | | 3/1987 | Miltenburger et al. |
| 4,696,156 A | | 9/1987 | Burr et al. |
| 4,722,357 A | | 2/1988 | Wynosky |
| 4,979,362 A | | 12/1990 | Vershure, Jr. |
| 5,058,617 A | * | 10/1991 | Stockman .............. B64D 33/02 |
| | | | 137/15.1 |
| 5,102,379 A | | 4/1992 | Pagluica et al. |
| 5,141,400 A | | 8/1992 | Murphy et al. |
| 5,145,126 A | | 9/1992 | Patilla |
| 5,317,877 A | | 6/1994 | Stuart |
| 5,361,580 A | | 11/1994 | Ciokajlo et al. |
| 5,433,674 A | | 7/1995 | Sheridan et al. |
| 5,447,411 A | | 9/1995 | Curley et al. |
| 5,466,198 A | | 11/1995 | McKibbin et al. |
| 5,524,847 A | | 6/1996 | Brodell et al. |
| 5,634,767 A | | 6/1997 | Dawson |
| 5,677,060 A | | 10/1997 | Terentieva et al. |
| 5,778,659 A | | 7/1998 | Duesler et al. |
| 5,857,836 A | | 1/1999 | Stickler et al. |
| 5,915,403 A | | 6/1999 | McConachie et al. |
| 5,915,917 A | | 6/1999 | Eveker et al. |
| 5,975,841 A | | 11/1999 | Lindemuth et al. |
| 5,985,470 A | | 11/1999 | Spitsberg et al. |
| 6,223,616 B1 | | 5/2001 | Sheridan |
| 6,315,815 B1 | | 11/2001 | Spadaccini et al. |
| 6,318,070 B1 | | 11/2001 | Rey et al. |
| 6,387,456 B1 | | 5/2002 | Eaton, Jr. et al. |
| 6,517,341 B1 | | 2/2003 | Brun et al. |
| 6,607,165 B1 | | 8/2003 | Manteiga et al. |
| 6,709,492 B1 | | 3/2004 | Spadaccini et al. |
| 6,814,541 B2 | | 11/2004 | Evans et al. |
| 6,883,303 B1 | | 4/2005 | Seda |
| 7,021,042 B2 | | 4/2006 | Law |
| 7,219,490 B2 | | 5/2007 | Dev |
| 7,328,580 B2 | | 2/2008 | Lee et al. |
| 7,374,403 B2 | | 5/2008 | Decker et al. |
| 7,591,754 B2 | | 9/2009 | Duong et al. |
| 7,632,064 B2 | | 12/2009 | Somanath et al. |
| 7,662,059 B2 | | 2/2010 | McCune |
| 7,770,377 B2 | | 8/2010 | Rolt |
| 7,806,651 B2 | | 10/2010 | Kennepohl et al. |
| 7,824,305 B2 | | 11/2010 | Duong et al. |
| 7,828,682 B2 | | 11/2010 | Smook |
| 7,926,260 B2 | | 4/2011 | Sheridan et al. |
| 7,997,868 B1 | | 8/2011 | Liang |
| 8,205,432 B2 | | 6/2012 | Sheridan |
| 2004/0187475 A1 | * | 9/2004 | Usab, Jr. ................. F01D 5/142 |
| | | | 60/226.1 |
| 2006/0056977 A1 | * | 3/2006 | Ramstein .................. F02C 7/05 |
| | | | 416/245 R |
| 2006/0130456 A1 | | 6/2006 | Suciu |
| 2006/0228206 A1 | | 10/2006 | Decker et al. |
| 2008/0003096 A1 | | 1/2008 | Kohli et al. |
| 2008/0116009 A1 | | 5/2008 | Sheridan et al. |
| 2008/0283676 A1 | | 11/2008 | Jain et al. |
| 2008/0310956 A1 | | 12/2008 | Jain |
| 2008/0317588 A1 | | 12/2008 | Grabowski et al. |
| 2009/0056343 A1 | | 3/2009 | Suciu et al. |
| 2009/0304518 A1 | | 12/2009 | Kodama et al. |
| 2009/0314881 A1 | | 12/2009 | Suciu et al. |
| 2010/0019101 A1 | | 1/2010 | Smith et al. |
| 2010/0034659 A1 | * | 2/2010 | Fujimura .................. F02K 3/06 |
| | | | 416/219 R |
| 2010/0105516 A1 | | 4/2010 | Sheridan et al. |
| 2010/0148396 A1 | | 6/2010 | Xie et al. |
| 2010/0212281 A1 | | 8/2010 | Sheridan |
| 2010/0215479 A1 | | 8/2010 | Prasad et al. |
| 2010/0218483 A1 | | 9/2010 | Smith |
| 2010/0331139 A1 | | 12/2010 | McCune |
| 2011/0159797 A1 | | 6/2011 | Beltman et al. |
| 2011/0167792 A1 | | 7/2011 | Johnson |
| 2011/0220217 A1 | | 9/2011 | Bensilum |
| 2011/0293423 A1 | | 12/2011 | Bunker et al. |
| 2012/0124964 A1 | | 5/2012 | Hasel et al. |
| 2012/0222397 A1 | * | 9/2012 | Smith ................... F01D 17/162 |
| | | | 60/226.3 |
| 2013/0192256 A1 | * | 8/2013 | Suciu ........................ F02K 3/06 |
| | | | 60/805 |
| 2013/0195647 A1 | * | 8/2013 | Muldoon ............... F02K 3/068 |
| | | | 415/229 |

FOREIGN PATENT DOCUMENTS

| | | |
|---|---|---|
| FR | 2958974 | 10/2011 |
| GB | 1190364 | 5/1970 |
| GB | 1 499 574 | 2/1978 |
| GB | 1516041 A | 6/1978 |
| GB | 2041090 A | 9/1980 |
| GB | 2 259 114 A | 3/1993 |
| GB | 2 259 115 A | 3/1993 |

(56) References Cited

FOREIGN PATENT DOCUMENTS

| | | |
|---|---|---|
| GB | 2426792 A | 12/2006 |
| WO | 2007038674 A1 | 4/2007 |
| WO | 2011141678 | 11/2011 |

OTHER PUBLICATIONS

Fathi Ahmad Single vs. Two Stage High Pressure Turbine Design of Modern Aero Engines, the American Society of Mechanical Engineers, 1999 (Year: 1999).*

Albers, J., and Felderman, E., "Boundary Layer Analysis of Subsonic Inlet Diffuser Geometries for Engine Nacelles", NASA Technical Note D-7520. Lewis Research Center, Cleveland, Ohio, (Year: 1974).*

NPL.*

Wikipedia. Stiffness. Retrieved Jun. 28, 2018 from: https://en.wikipedia.org/wiki/Stiffness.

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

International Search Report and Written Opinion for PCT Application No. PCT/US2014/018544, mailed Jun. 27, 2014.

International Preliminary Report on Patentability for International Application No. PCT/US2014/018544 mailed Sep. 17, 2015.

Extended European Search Report for EP Application No. 19174038.0 dated Aug. 21, 2019.

Extended European Search Report for EP Application No. 14759888.2 dated Oct. 10, 2016.

Wendus "Follow-on-Technology Requirement Study for Advanced Subsonic Transport" 58 pages. Aug. 2003.

Marwan "Optimum Tubofan Engine Performance Through Variation of Bypass Ratio" 16 pages. 2013.

Peters"Ultra-Short Nacelles for Low Fan Pressure Ratio Propulsors" 16 pages. 2014.

Clark "Inlet Shape Effects on the Far Field Sound of a Model Fan" 11 pages. 1997.

Reshotko, M., Karchmer, A., Penko, P.F. and Mcardle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

Rolls-Royce M45H. Jane's Aero-engines, Aero-engines-Turbofan. Feb. 24, 2010.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France. pp. 1-595.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report-168113. R83AEB592. Jun. 1, 1985. pp. 1-476.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-726 and 764-771.

Shah, D.M. (1992). MoSi2 and other silicides as high temperature structural materials. Superalloys 1992. The Minerals, Metals, & Materials Society. pp. 409-422.

Shorter Oxford English Dictionary, 6th Edition. (2007), vol. 2, N-Z, pp. 1888.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Singh, A. (2005). Application of a system level model to study the planetary load sharing behavior. Jounal of Mechanical Design. vol. 127. May 2005. pp. 469-476.

Singh, B. (1986). Small engine component technology (SECT) study. NASA CR-175079. Mar. 1, 1986. pp. 1-102.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Smith-Boyd, L. and Pike, J. (1986). Expansion of epicyclic gear dynamic analysis program. Prepared for NASA. NASA CR-179563. Aug. 1986. pp. 1-98.

Sowers, H.D. and Coward, W.E. (1978). QCSEE over-the-wing (OTW) engine acuostic design. NASA-CR-135268. Jun. 1, 1978. pp. 1-52.

Spadaccini, L.J., and Huang, H. (2002). On-line fuel deoxygenation for coke suppression. ASME, Jun. 2002. pp. 1-7.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Sutliff, D. (2005). Rotating rake turbofan duct mode measurement system. NASA TM-2005-213828. Oct. 1, 2005. pp. 1-34.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Sweetman, B. and Sutton, O. (1998). Pratt & Whitney's surprise leap. Interavia Business & Technology, 53.621, p. 25.

Taylor, W.F. (1974). Deposit formation from deoxygenated hydrocarbons. I. General features. Ind. Eng. Chem., Prod. Res. Develop., vol. 13(2). 1974. pp. 133-138.

(56)                    References Cited

OTHER PUBLICATIONS

Taylor, W.F. (1974). Deposit formation from deoxygenated hydro-carbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines-Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. p. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

(56) References Cited

OTHER PUBLICATIONS

Gliebe, P.R., Ho, P.Y., and Mani, R. (1995). UHB engine fan and broadband noise reduction study. NASA CR-198357. Jun. 1995. pp. 1-48.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Gray, D.E. (1978). Energy efficient engine preliminary design and integration studies. NASA-CP-2036-PT-1. Nov. 1978. pp. 89-110.

Gray, D.E. (1978). Energy efficient engine preliminary design and integration studies. Prepared for NASA. NASA CR-135396. Nov. 1978. pp. 1-366.

Gray, D.E. and Gardner, W.B. (1983). Energy efficient engine program technology benefit/cost study—vol. 2. NASA CR-174766. Oct. 1983. pp. 1-118.

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

Griffiths, B. (2005). Composite fan blade containment case. Modern Machine Shop. Retrieved from: http://www.mmsonline.com/articles/composite-fan-blade-containment-case pp. 1-4.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.

Gunston, B. (Ed.) (2000). Jane's aero-engines, Issue seven. Coulsdon, Surrey, UK: Jane's Information Group Limited. pp. 510-512.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Guynn, M.D., et al., "Analysis of turbofan design options for an advanced single-aisle transport aircraft", American Institute of Aeronautics and Astronautics, 2009, pp. 1-13.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Han, J., Dutta, S., and Ekkad, S.V. (2000). Gas turbine heat transfer and cooling technology. New York, NY: Taylor & Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp. 1-13.

Hess, C. (1998). Pratt & Whitney develops geared turbofan. Flug Revue 43(7). Oct. 1998.

Hill, P.G., Peterson, C.R. (1965). Mechanics and thermodynamics of propulsion. Addison-Wesley Publishing Company, Inc. pp. 307-308.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, U.S. (2016). Application of deterministic and probabilistic system design methods and enhancements of conceptual design tools for ERA project final report. NASA/CR-2016-219201. May 1, 2016. pp. 1-240.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

McCracken, R.C. (1979). Quiet short-haul research aircraft familiarization document. NASA-TM-81149. Nov. 1, 1979. pp. 1-76.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

(56)        References Cited

OTHER PUBLICATIONS

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise Impact. NASA-CR-114759. Jun. 1, 1974. pp. 1-397.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-Ill Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-460.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

QCSEE preliminary analyses and design report. vol. II. (1974). NASA-CR-134839. Oct. 1, 1974. pp. 340-630.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

2003 NASA seal/secondary air system workshop. (2003). NASA/CP-2004-212963/vol. 1. Sep. 1, 2004. pp. 1-408.

About GasTurb. Retrieved Jun. 26, 2018 from: http://gasturb.de/about-gasturb.html.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

Aerospace Information Report. (2008). Advanced ducted propulsor in-flight thrust determination. SAE International AIR5450. Aug. 2008. p. 1-392.

Agarwal, B.D and Broutman, L.J. (1990). Analysis and performance of fiber composites, 2nd Edition. John Wiley & Sons, Inc. New York: New York. pp. 1-11, 13-23, 26-33, 50-51, 56-58, 60-61, 64-71, 87-89, 324-329, 436-437.

AGMA Standard (1997). Design and selection of components for enclosed gear drives. lexandria, VA: American Gear Manufacturers Association. pp. 1-48.

AGMA Standard (1999). Flexible couplings—Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Avco Lycoming Divison. ALF 502L Maintenance Manual. Apr. 1981. pp. 1-118.

Aviadvigatel D-110. Jane's Aero-engines, Aero-engines-Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp. 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

(56)　　　　　References Cited

OTHER PUBLICATIONS

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retreived from https://geaviation.com/sites/default/files/datasheet-CF6-80C2.pdf.

Datasheet. CFM56-5B for the Airbus A320ceo family and CFM56-7B for the Boeing 737 family. https://www.cfmaeroengines.com/.

Datasheet. Genx™ high bypass turbofan engines. Retreived from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-617.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Dr. Magdy Attia, In re U.S. Pat. No. 8,313,280, Executed Oct. 21, 2016, pp. 1-88.

Declaration of Dr. Magdy Attia, In re U.S. Pat. No. 8,517,668, Executed Dec. 8, 2016, pp. 1-81.

Declaration of John Eaton, Ph.D. In re U.S. Pat. No. 8,689,568, Executed Mar. 28, 2016, pp. 1-87.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines-Turbofan. Feb. 9, 2012.

Honeywell LF502. Jane's Aero-engines, Aero-engines-Turbofan. Aug. 17, 2016.

Honeywell LF507. Jane's Aero-engines, Aero-engines-Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines-Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag Gmbh & Co. KGaA. pp. 1-24.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

Ivchenko-Progress AI-727M. Jane's Aero-engines, Aero-engines-Turbofan. Nov. 27, 2011.

Ivchenko-Progress D-436. Jane's Aero-engines, Aero-engines-Turbofan. Feb. 8, 2012.

Ivchenko-Progress D-727. Jane's Aero-engines, Aero-engines-Turbofan. Feb. 7, 2007.

Jacobson, N.S. (1993). Corrosion of silicon-based ceramics in combustion environments. J. Am. Ceram. Soc. 76(1). pp. 3-28.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

(56) References Cited

OTHER PUBLICATIONS

Johnston, R.P., Hirschkron, R., Koch, C.C., Neitzel, R.E., and Vinson, P.W. (1978). Energy efficient engine: Preliminary design and integration study-final report. NASA CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt & Whitney launches geared turbofan engine. Aviation Week & Space Technology, 148(8). p. 32-4.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press. p. 11.

Knip, Jr., G. (1987). Analysis of an advanced technology subsonic turbofan incorporating revolutionary materials. NASA Technical Memorandum. May 1987. pp. 1-23.

Kollar, L.P. and Springer, G.S. (2003). Mechanics of composite structures. Cambridge, UK: Cambridge University Press. p. 465.

Krantz, T.L. (1990). Experimental and analytical evaluation of efficiency of helicopter planetary stage. NASA Technical Paper. Nov. 1990. pp. 1-19.

Kurzke, J. (2001). GasTurb 9: a program to calculate design and off-design performance of gas turbines. Retrieved from: https://www.scribd.com/document/92384867/GasTurb9Manual.

Kurzke, J. (2012). GasTurb 12: Design and off-design performance of gas turbines. Retrieved from: https://www.scribd.com/document/153900429/GasTurb-12.

Kurzke, J. (2008). Preliminary Design, Aero-engine design: From state of the art turbofans towards innovative architectures. pp. 1-72.

Kurzke, J. (2009). Fundamental differences between conventional and geared turbofans. Proceedings of ASME Turbo Expo: Power for Land, Sea, and Air. 2009, Orlando, Florida. pp. 145-153.

Leckie, F.A. and Dal Bello, D.J. (2009). Strength and stiffness of engineering systems. Mechanical Engineering Series. Springer. pp. 1-10, 48-51.

Lee, K.N. (2000). Current status of environmental barrier coatings for Si-Based ceramics. Surface and Coatings Technology 133-134, 2000. pp. 1-7.

Levintan, R.M. (1975). Q-Fan demonstrator engine. Journal of Aircraft. vol. 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018. pp. 1-400.

Lord, W.K., Macmartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

* cited by examiner

GAS TURBINE ENGINE INLET

CROSS-REFERENCE TO RELATED APPLICATIONS

This disclosure is a continuation of U.S. patent application Ser. No. 14/767,396 filed Aug. 12, 2015, which is a United States National Phase of PCT/US2014/018544 filed Feb. 26, 2014, which claims benefit of provisional application No. 61/772,460 filed Mar. 4, 2013.

BACKGROUND

This disclosure relates to a gas turbine engine inlet. More particularly, the disclosure relates to a relative position of a fan and a spinner relative to a fan nacelle inlet.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large fan blades. One type of gas turbine engine utilizes a high bypass flow to provide a significant portion of thrust from a fan arranged in the bypass flow path, which extends from an inlet of the gas turbine engine.

The inlet may be cambered such that a plane that is tangent to the inlet leading edge is tilted or drooped relative to the engine centerline, as shown by plane A in FIG. 2a. The angle of inlet droop may be in the range zero to six degrees, with the inlet tilted downward so that the inlet length at the top is longer than the length at the bottom. It is also known to have negative droop or negative scarf inlet designs such that the inlet length at the bottom extends furthest forward.

Inlet throat is defined at an axial position (at plane B) within the inlet that has a local minimum area normal to the flow direction. A plane located at the throat (plane B) may be tilted relative to the engine axis, similar to the inlet leading edge plane (plane A).

An inlet length (L1) is defined from the midpoint of the inlet leading edge plane A at inlet leading edge 165 to fan face plane C at the leading edge 169 of the fan 142, where plane C is taken perpendicular to the engine axis at the axial position of the fan blade tip leading edge. The ratio of inlet length L1 to fan leading edge tip diameter, $L1/D_{fan}$, is generally in the range 0.5 to 0.7 in typical inlet systems on high bypass ratio turbofan engines.

A fan spinner 170 forms the inner flowpath through the fan blade. The diameter of the spinner at the fan hub leading edge corresponds to $D_s$ in FIG. 2A. The hub/tip ratio of the fan, $D_s/D_{fan}$, is generally about 0.3 and may be in the range 0.25 to 0.35. The spinner may have a pointed leading edge with a generally conical shape, or it may have a blunt rounded leading edge shape. The axial length of the spinner from its leading edge to fan face plane C corresponds to L2. The ratio of spinner length to overall inlet length, L2/L1, is less than 0.5 in a typical gas turbine engine inlet on high bypass turbofan engines.

A typical internal area distribution for the gas turbine engine inlet is shown in FIG. 2b, normalized to the flow area at the fan face, $A_{fan}=\pi/4\ (D_{fan}^2-D_s^2)$. There is a local minimum area at the inlet throat plane B, followed by a diffusing section from the throat 176 to the leading edge 174 of the fan spinner 170 in which the flow area increases, then there is a convergent section beginning approximately at the spinner leading edge 174 to the fan face (plane C) in which the flow area decreases due to the area blockage of the spinner 170.

SUMMARY

In one exemplary embodiment, a gas turbine engine including a fan nacelle and a core nacelle that provide a bypass flow path radially between. The fan nacelle has an inlet including a throat. The inlet has an inlet forward-most point. A fan is arranged in the bypass flow path and rotatable about an axis. The fan has a leading edge recessed from the inlet forward-most point an inlet length in an axial direction. A spinner has a spinner length from a spinner forward-most point to the leading edge. A ratio of the spinner length to inlet length is equal to or greater than about 0.5.

In a further embodiment of the above, includes a plane at the throat and a fan hub supporting the fan. A spinner is mounted on the fan hub forward of the fan. At least a portion of the spinner is arranged forward of the plane.

In a further embodiment of any of the above, a spinner forward-most point is arranged forward of the plane and aft of a forward-most point of the inlet.

In a further embodiment of any of the above, the ratio is about 0.65

In a further embodiment of any of the above, the length extends from a fan blade leading edge forward-most point to the inlet forward-most point.

In a further embodiment of any of the above, the fan includes a diameter. The ratio of the inlet length to diameter is equal to or less than about 0.4.

In a further embodiment of any of the above, the ratio of the inlet length to the diameter is about 0.3.

In a further embodiment of any of the above, an area is provided between the fan nacelle and the spinner. The area is monotonically convergent from the inlet to the fan.

In a further embodiment of any of the above, the gas turbine engine includes a compressor section fluidly connected to the fan. The compressor includes a high pressure compressor and a low pressure compressor. A combustor is fluidly connected to the compressor section. A turbine section is fluidly connected to the combustor. The turbine section includes a high pressure turbine coupled to the high pressure compressor via a shaft and a low pressure turbine.

In a further embodiment of any of the above, the gas turbine engine includes a geared architecture that operatively interconnects the turbine section to the fan.

In a further embodiment of any of the above, the gas turbine engine is a high bypass geared aircraft engine that has a bypass ratio of greater than about six (6).

In a further embodiment of any of the above, the gas turbine engine includes a Fan Pressure Ratio of less than about 1.45.

In a further embodiment of any of the above, the low pressure turbine has a pressure ratio that is greater than about 5.

BRIEF DESCRIPTION OF THE DRAWINGS

The disclosure can be further understood by reference to the following detailed description when considered in connection with the accompanying drawings wherein:

FIG. 2a schematically illustrates a prior art fan and inlet arrangement.

FIG. 2b graphically depicts an internal area distribution from the inlet leading edge to a fan face for the fan and inlet arrangement of FIG. 2a.

FIG. 3b graphically depicts an internal area distribution from the inlet leading edge to a fan face for the fan and inlet arrangement of FIG. 3a.

DETAILED DESCRIPTION

Figure 1:
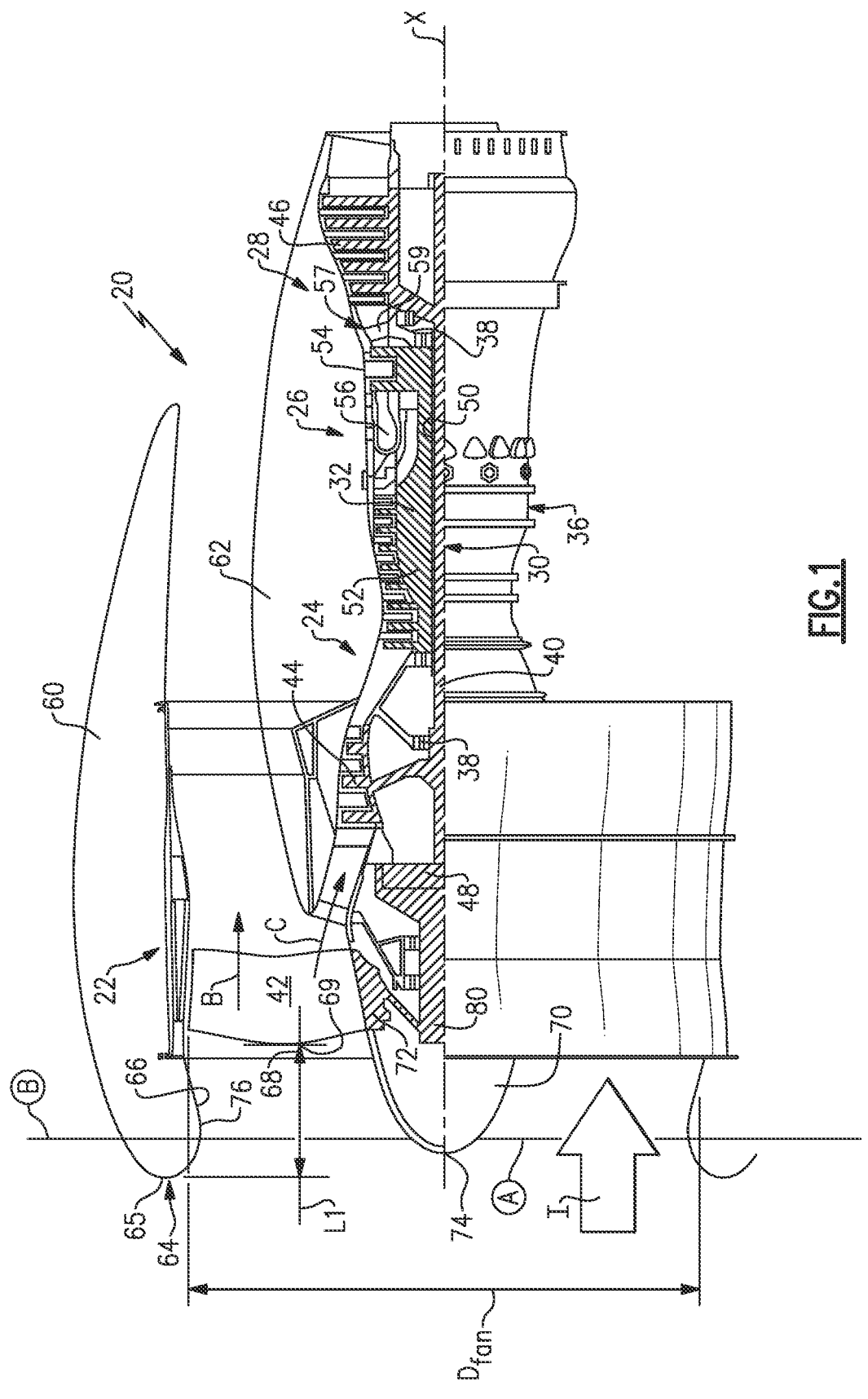
FIG. 1 schematically illustrates a gas turbine engine embodiment.
Figures 2A, 2B:
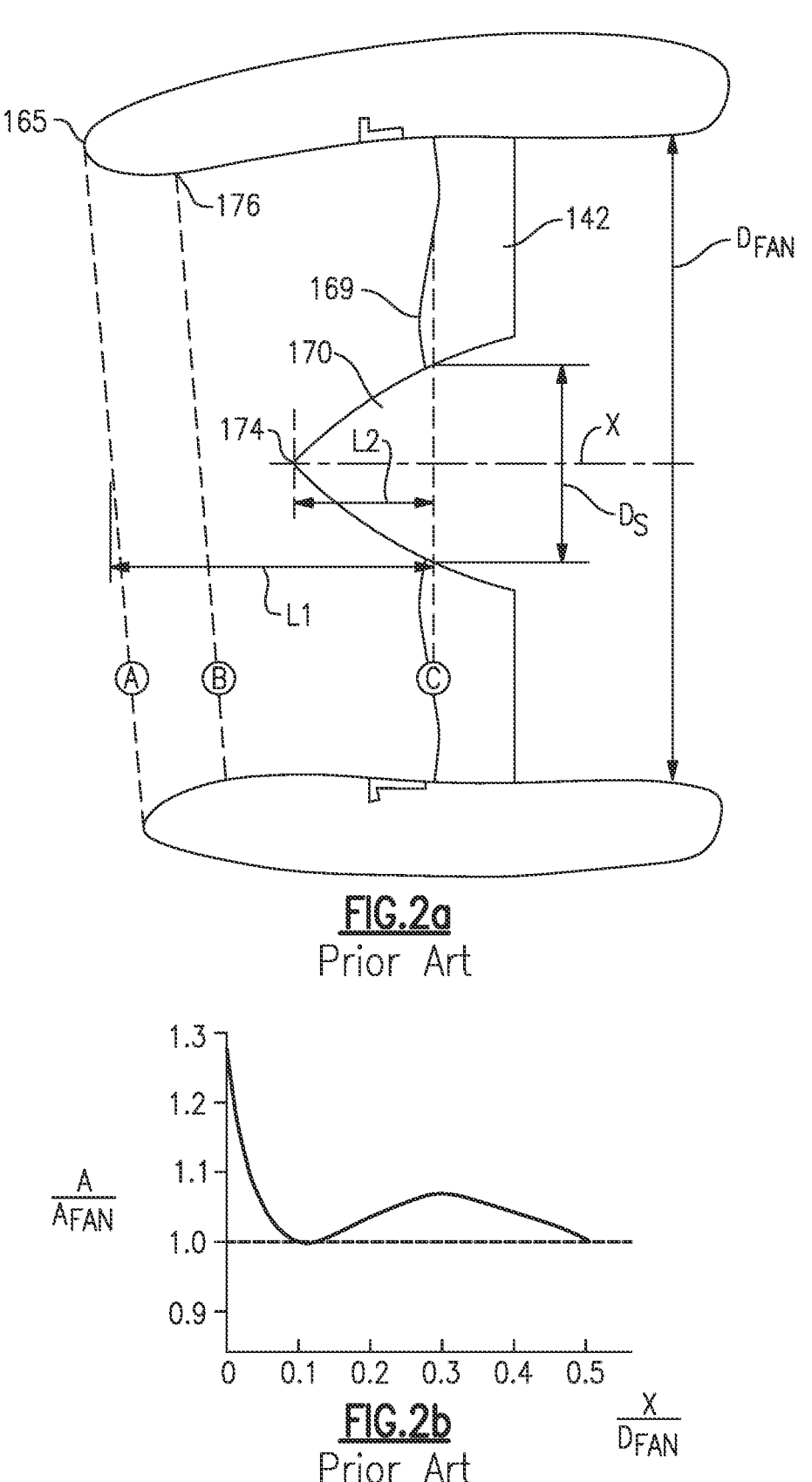

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed", as disclosed herein according to one non-limiting embodiment, is less than about 1150 ft/second.

The bypass flow path B is provided radially between a fan nacelle 60 and core nacelle 62. The fan nacelle 60 includes an inlet 64 that receives an inlet flow I into the engine 20. The inlet 64 includes an inner surface 66 that provides an annular shape having a throat 76 in plane B, which is the minimum cross-sectional area of the inlet 64 without a spinner 70 installed. The throat 76 is arranged upstream from the fan blades 42.

The fan blades 42 include a fan leading edge 68 having a leading edge forward-most point 69. The fan blades 42 have an outer diameter D$_{fan}$. The leading edge forward-most point 69 is spaced a length L1 from an inlet forward-most point 65 of the inlet 64 (in plane A).

The fan blades 42 are supported by a fan hub 72, which is rotationally driven through a fan shaft 80 coupled to the geared architecture 48. The spinner 70 is mounted to the fan hub 72 upstream from the fan blades 42 to provide an aerodynamic inner flow path to the fan section 22.

The L1/D$_{fan}$ ratio (sometimes referred to as an "L/D ratio") of the engine 20 is less than or equal to about 0.4, and in one example, about 0.3. The term "about" means +/−0.05. The spinner 70 includes a spinner forward-most point 74, which is arranged significantly forward within the inlet 64 than a typical high bypass ratio engine. In the example illustrated, the spinner forward-most point 74 is arranged forward of the plane 78. In the example, the spinner forward-most point 74 does not extend forward of the inlet forward-most point 65.

The engine 20 has a relatively large diameter fan section 22, which adds weight to the engine 20. One way of reducing the weight of the engine 20 is to reduce the nacelle inlet length L1. However, a short inlet typically results in inlet lip flow separation under a high angle of attack, which results in a reduction of the efficiency of the fan section 22 and resulting in a corresponding reduction of the engine's thrust. To reduce the tendency for the flow to separate when using a short length L1, the spinner 70 is moved forward. With a forwardly-located spinner, the pressure at the nacelle inlet lip and inner surface 66 will reduce the shock at crosswind conditions and at high angles of attack when the engine is at full power.

Figure 3A:
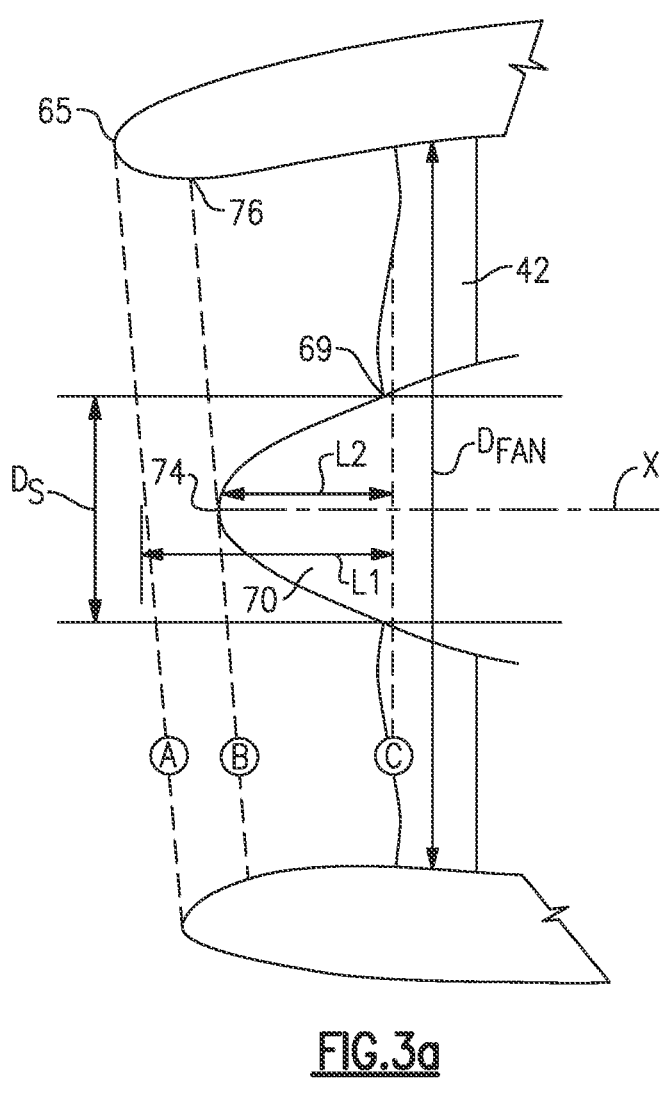
FIG. 3a schematically illustrates an example fan and inlet arrangement.

The gas turbine engine inlet 64 has a relatively short inlet and fan spinner such that the length of the spinner L2 is equal to or greater than half the overall length of the inlet L1, as shown in FIG. 3*a*. In one example embodiment, the ratio of spinner length to overall inlet length, L2/L1, is about 0.65 and the leading edge 74 of the spinner 70 is located at the throat 76 of the inlet 64.

Figure 3B:
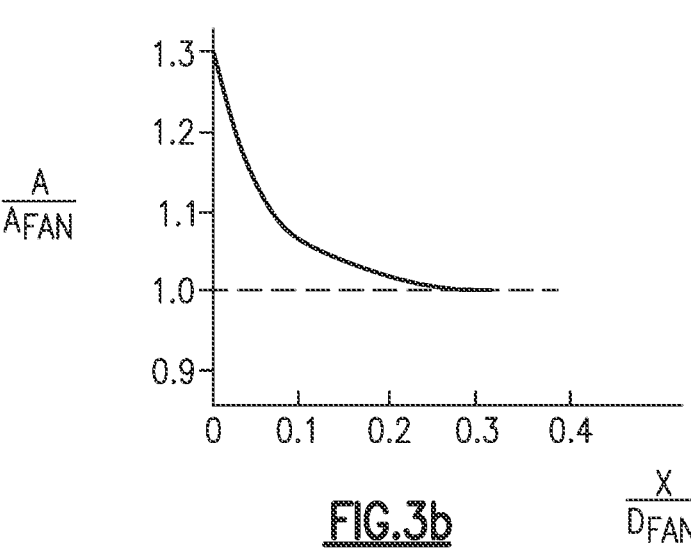

In this manner the effect of the area blockage of the fan spinner occurs at or immediately behind the throat 76, thus there is no local minimum internal area at the throat 76 and there is no diffusing section in the internal area distribution. The internal area distribution is monotonically convergent from the inlet leading edge to the fan face, as shown in FIG. 3*b*. A monotonically convergent internal area distribution is favorable to good aerodynamic performance of the gas turbine engine inlet at conditions of low flight speed and high engine power, particularly at high aircraft angle of attack or in crosswind operation.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a fan section including a fan rotatable about an engine longitudinal axis, the fan including a plurality of fan blades;

a fan nacelle surrounding the fan and including an inlet, the inlet including an inlet leading edge plane and a throat aft of the inlet leading edge plane in an axial direction relative to the engine longitudinal axis;
   a core nacelle, and wherein the fan nacelle and the core nacelle establish a bypass flow path;
   a compressor section arranged in the core nacelle, the compressor section including a first compressor and a second compressor;
   a turbine section arranged in the core nacelle, the turbine section including a fan drive turbine and a second turbine;
   a fan hub mounting the fan and a spinner, and the spinner mounted forward of the fan in the axial direction;
   a geared architecture, and wherein the fan drive turbine drives the fan through the geared architecture;
   wherein the fan includes a fan leading edge forward-most point spaced apart from the inlet leading edge plane by an inlet length in the axial direction;
   wherein the spinner includes a spinner length from a spinner forward-most point to the fan leading edge forward-most point in the axial direction;
   wherein a ratio of the spinner length to the inlet length is greater than or equal to 0.5;
   wherein a fan pressure ratio is less than or equal to 1.45 measured across the plurality of fan blades alone at cruise at 0.8 Mach and 35,000 feet; and
   wherein a ratio of the inlet length to a diameter of the fan is less than or equal to 0.4.

2. The gas turbine engine according to claim 1, further comprising a bypass ratio of greater than or equal to six.

3. The gas turbine engine according to claim 2, wherein the geared architecture includes a gear reduction ratio of greater than or equal to 2.3.

4. The gas turbine engine according to claim 3, wherein a hub/tip ratio of a diameter of the spinner at a leading edge of the fan hub to the diameter of the fan is between 0.25 and 0.35.

5. The gas turbine engine according to claim 3, wherein the spinner forward-most point is aft of the inlet leading edge plane in the axial direction.

6. The gas turbine engine according to claim 5, wherein the throat establishes a throat plane, and wherein the spinner forward-most point is forward of the throat plane in the axial direction.

7. The gas turbine engine according to claim 6, wherein the fan leading edge forward-most point is aft of the throat plane in the axial direction.

8. The gas turbine engine according to claim 7, wherein the inlet leading edge plane is defined tangent to inlet leading edge points of the fan nacelle, the inlet leading edge plane is tilted relative to a plane defined normal to the engine longitudinal axis by an inlet droop angle, and the inlet droop angle is between zero and six degrees.

9. The gas turbine engine according to claim 8, wherein the inlet leading edge plane is parallel to the throat plane.

10. The gas turbine engine according to claim 9, wherein a top of the fan nacelle includes a top inlet leading edge point, a bottom of the fan nacelle includes a bottom inlet leading edge point, and the inlet leading edge plane is tilted such that the top inlet leading edge point is forward of the bottom inlet leading edge point in the axial direction.

11. The gas turbine engine according to claim 10, wherein a hub/tip ratio of a diameter of the spinner at a leading edge of the fan hub to the diameter of the fan is between 0.25 and 0.35.

12. The gas turbine engine according to claim 7, wherein a normalized internal area distribution is defined between the inlet leading edge plane and the fan leading edge forward-most point, and the normalized internal area distribution is monotonically convergent.

13. The gas turbine engine according to claim 7, wherein the geared architecture includes an epicyclical gear train.

14. The gas turbine engine according to claim 13, wherein the bypass ratio is greater than or equal to ten.

15. The gas turbine engine according to claim 14, further comprising a low corrected fan tip speed of less than or equal to 1150 ft/second.

16. The gas turbine engine according to claim 15, wherein the fan drive turbine has an inlet, an outlet, and a pressure ratio of greater than or equal to five, the pressure ratio of the fan drive turbine being pressure measured prior to the inlet as related to pressure at the outlet prior to an exhaust nozzle.

17. The gas turbine engine according to claim 16, wherein:

the gas turbine engine is a two-spool engine including a low spool and a high spool;

the low spool includes an inner shaft interconnecting the geared architecture and the fan drive turbine;

the high spool includes an outer shaft concentric with the inner shaft, and the outer shaft interconnecting the second compressor and the second turbine.

18. The gas turbine engine according to claim 17, wherein the second turbine includes two stages.

19. The gas turbine engine according to claim 18, wherein the fan drive turbine includes a greater number of stages than the second turbine.

20. The gas turbine engine according to claim 19, wherein the first compressor includes three stages.

21. The gas turbine engine according to claim 20, wherein the second compressor includes a greater number of stages than the first compressor.

22. The gas turbine engine according to claim 21, wherein the fan drive turbine includes a lesser number of stages than the second compressor.

23. The gas turbine engine according to claim 22, wherein the turbine section includes a mid-turbine frame between the fan drive turbine and the second turbine, and the mid-turbine frame includes a vane arranged in a core flow path and supports a bearing system.

24. The gas turbine engine according to claim 22, wherein a hub/tip ratio of a diameter of the spinner at a leading edge of the fan hub to a diameter of the fan is between 0.25 and 0.35.

25. The gas turbine engine according to claim 22, wherein a normalized internal area distribution is defined between the inlet leading edge plane and the fan leading edge forward-most point, and the normalized internal area distribution is monotonically convergent.

* * * * *